June 7, 1949. F. McGOWEN ET AL 2,472,117
COMBUSTION CHAMBER CONSTRUCTION
Filed Dec. 7, 1945 2 Sheets-Sheet 2
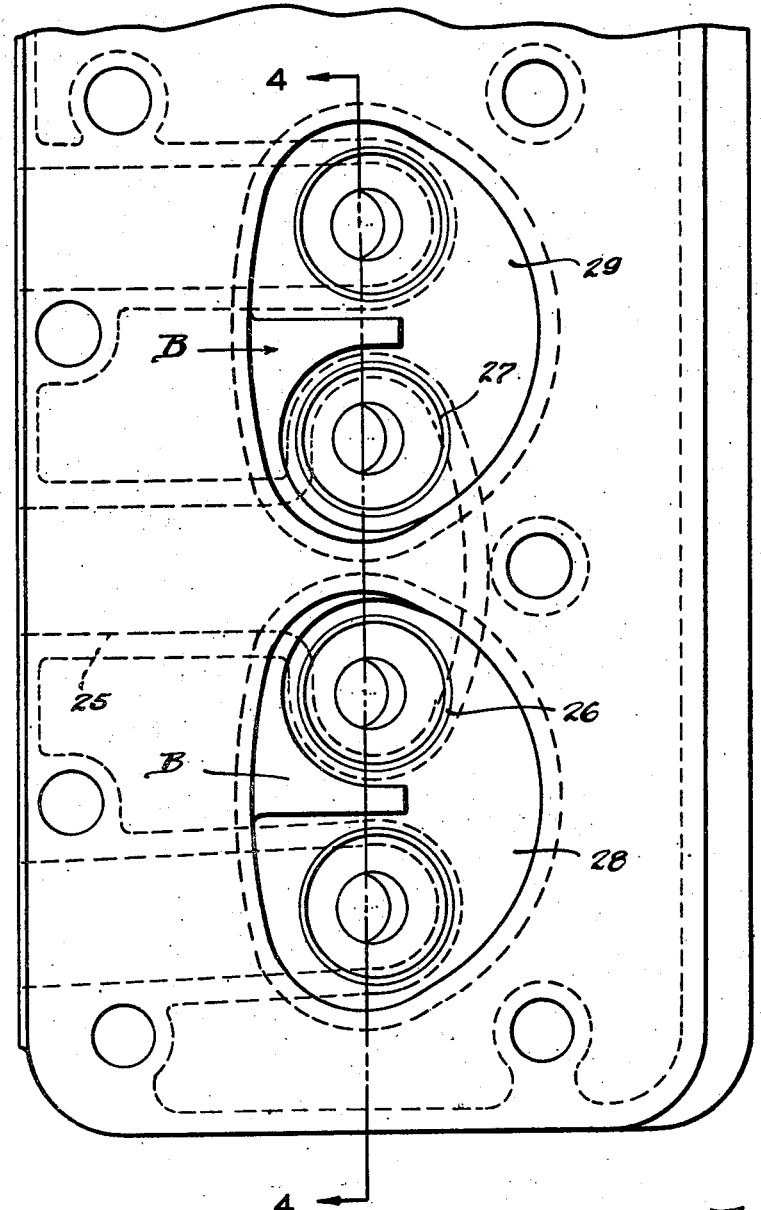
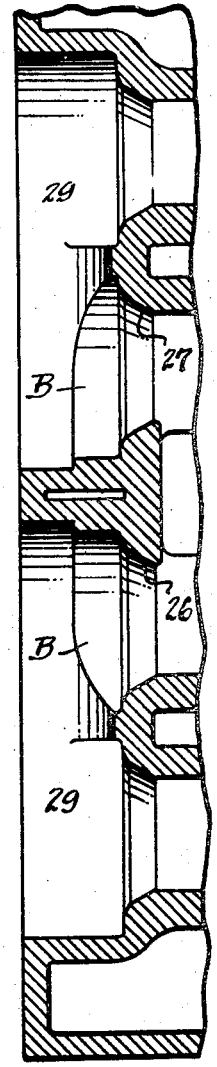
Inventors
Frank McGowen
Marion C. Travis
By Hauke & Hardesty
Attorneys Patented June 7, 1949

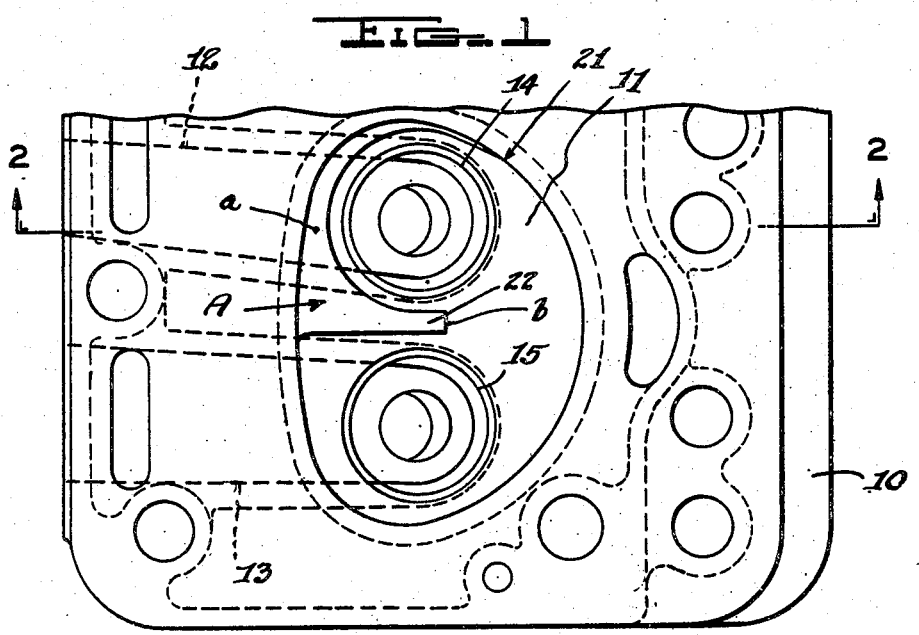
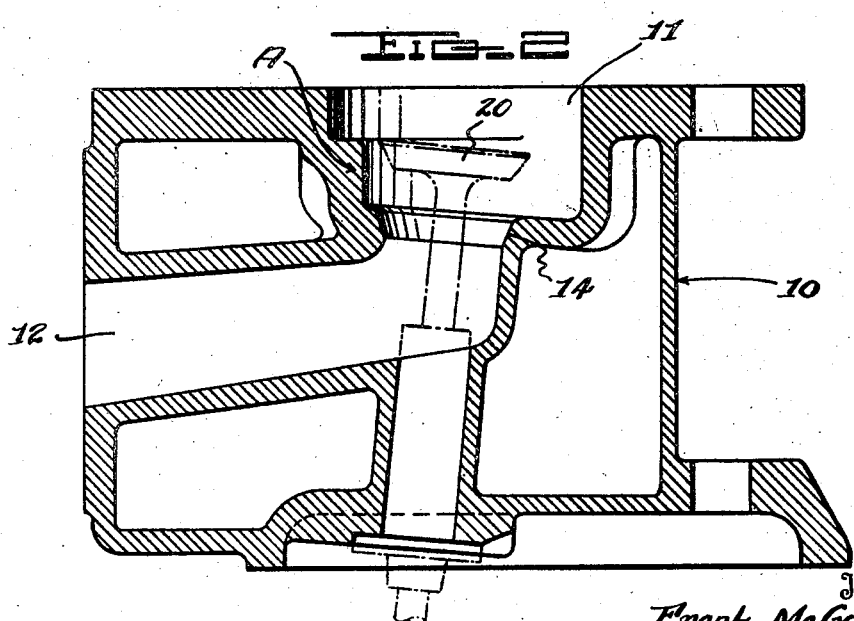

2,472,117

UNITED STATES PATENT OFFICE 2,472,117

COMBUSTION CHAMBER CONSTRUCTION

Frank McGowen and Marion C. Travis, Muskegon, Mich., assignors to Continental Motors Corporation, Muskegon, Mich., a corporation of Virginia Application December 7, 1945, Serial No. 633,323

8 Claims. (Cl. 123—191)

Our invention relates to an internal combustion engine and more particularly to a combustion chamber construction in which is incorporated a baffle structure, depending from the roof of the combustion chamber and partially surrounding the engine intake port to induce swirl and turbulence into the combustion charge admitted to said combustion chamber, and to further prevent the incoming gases from being directly moved over the hot exhaust valve located adjacent to the intake valve.

For a more detailed understanding of our invention, reference may be had to the accompanying drawings illustrating a preferred embodiment of same, and in which:

Fig. 1 is an inverted plan view of a cylinder head structure showing a combustion chamber;

Fig. 2 is a transverse sectional view taken on line 2—2 of Figure 1;

Figure 3 is an inverted plan view of cylinder structure embodying Siamesed intake ports; and Fig. 4 is a sectional view taken longitudinally on the line 4—4 of Fig. 3.

Referring more particularly to Figs. 1 and 2, our present invention is embodied in a cylinder head structure 10, which is provided with a combustion chamber 11, and intake and exhaust passages 12 and 13, which respectively terminate in intake and exhaust ports 14 and 15. Intake and exhaust valves are respectively associated with and operable to close said intake and exhaust ports, and in the present invention we have disclosed a standard poppet valve for intake port 14, which is shown in dotted lines in its wide open position.

We have constructed an improved combustion chamber by providing a baffle structure A which surrounds said intake port 14 and preferably provides a vertical arcuate surface projecting from the roof of the combustion chamber 11, and constructed substantially concentric with respect to the said intake port to provide a somewhat restricted area around the intake valve 20 in all open positions of same. Said baffle A merges with the side wall of the combustion chamber at 21 and extends more than half way around said intake port, and includes the laterally extending portion 22, lying intermediate the intake and exhaust ports, said side surface of said laterally projecting portion lie in a plane parallel to a plane extending normal to the vertical longitudinal engine plane, containing said intake and exhaust port centers. This lateral extension of the baffle is inclined to the roof of the combustion chamber beginning at point "a" and terminating at point "b," where same merges with the roof of the combustion chamber.

Figures 3 and 4 illustrate a modified cylinder head structure embodying a Siamese intake induction port 25 terminating into intake ports 26 and 27 respectively opening into combustion chambers 28 and 29. These combustion chambers are provided with baffles B constructed similarly, as baffles A in Figure 1. Baffles B extend concentrically around the intake ports and laterally project between the intake and exhaust ports similarly as baffle A.

While we have illustrated our invention in connection with certain preferred embodiments, it will be apparent to those skilled in the art to which our invention pertains, that various modifications and changes may be made therein without departing from the spirit of our invention or from the scope of the appended claims.

We claim:

1. In an internal combustion engine of the overhead valve type, a cylinder head structure provided with a combustion chamber, intake and exhaust passages terminating respectively in intake and exhaust ports, and intake and exhaust valves respectively associated with said intake and exhaust ports and opening inwardly of said combustion chamber, and an annular baffle structure projecting downwardly from the roof of said combustion chamber and closely bounding a portion of said intake port periphery but radially spaced therefrom and from said intake valve when in open position.

2. In an internal combustion engine of the overhead valve type, a cylinder head structure provided with a combustion chamber, intake and exhaust passages terminating respectively in intake and exhaust ports, and intake and exhaust valves respectively associated with said intake and exhaust ports and opening inwardly of said combustion chamber, and an annular baffle structure projecting downwardly from the roof of said combustion chamber and closely bounding about half of said intake port periphery, said baffle having a portion extending laterally intermediate said intake and exhaust ports beyond the vertical engine plane containing said exhaust and intake port centers.

3. In an internal combustion engine of the overhead valve type, a cylinder head structure provided with a combustion chamber, intake and exhaust passages terminating respectively in intake and exhaust ports, and intake and exhaust valves respectively associated with said intake and exhaust ports and opening inwardly of said combustion chamber, and a baffle projecting downwardly from the roof of said combustion chamber and relatively closely bounding about half of said intake port periphery, said baffle having a portion extending laterally intermediate said intake and exhaust ports beyond the vertical engine plane containing said intake and exhaust port centers, said laterally extending baffle portion sloping generally with respect to the roof of said combustion chamber and merging therewith at its extreme end.

4. In an internal combustion engine of the overhead valve type, a cylinder head structure provided with a combustion chamber, intake and exhaust passages terminating respectively in intake and exhaust ports, and intake and exhaust valves respectively associated with said intake and exhaust ports and opening inwardly of said combustion chamber, and a baffle structure constructed substantially annular in plan and projecting downwardly from the roof of said combustion chamber, and relatively closely bounding about half of said intake port periphery, said baffle including a portion extending laterally intermediate said intake and exhaust ports, said baffle for the most part projecting downwardly a distance substantially the same as the distance between the closed and open position of said intake valve and radially spaced from the intake valve when in open position.

5. In an internal combustion engine of the overhead valve type, a cylinder head structure provided with a combustion chamber, intake and exhaust passages terminating respectively in intake and exhaust ports, and intake and exhaust valves respectively associated with said intake and exhaust ports and opening inwardly of said combustion chamber, and a baffle projecting downwardly from the roof of said combustion chamber and concentrically closely encircling more than one-half of said intake port periphery and constructed to deflect a major portion of the incoming gases from direct flow toward said exhaust valve.

6. In an internal combustion engine of the overhead valve type, a cylinder head structure provided with a combustion chamber, intake and exhaust passages terminating respectively in intake and exhaust ports, and intake and exhaust valves respectively associated with said intake and exhaust ports and opening inwardly of said combustion chamber, and a baffle projecting downwardly from the roof of said combustion chamber and concentrically closely bounding about half of said intake port periphery, said baffle having a portion extending laterally intermediate said intake and exhaust ports beyond the vertical engine plane containing the intake and exhaust port centers, said laterally extending baffle portion sloping generally with respect to the roof of said combustion chamber and merging therewith at its extreme end, the remaining portion of said baffle having substantially a uniform depth downwardly substantially the same as the distance between the closed and open position of said intake valve.

7. In an internal combustion engine of the overhead valve type, a cylinder head structure provided with a combustion chamber, intake and exhaust passages terminating respectively in intake and exhaust ports, and intake and exhaust valves respectively associated with said intake and exhaust ports and opening inwardly of said combustion chamber, and a baffle structure projecting downwardly from the roof of said combustion chamber and closely bounding a portion of said intake port periphery, said baffle structure provided with an inner annular vertically extending face constructed concentric to said intake port and having clearance with respect to said intake valve when same is in open position.

8. In an internal combustion engine of the overhead valve type, a cylinder head structure provided with a combustion chamber, intake and exhaust passages terminating respectively in intake and exhaust ports, and intake and exhaust valves respectively associated with said intake and exhaust ports and opening inwardly of said combustion chamber, and a baffle structure projecting downwardly from the roof of said combustion chamber and spaced from and closely bounding a portion of said intake port periphery, said baffle structure provided with an inner annular face extending vertically of said baffle constructed concentric to said intake port, said baffle comprising a portion extending intermediate the intake and exhaust ports and provided with an outer face lying in a plane extending normal to a longitudinal vertical engine plane containing said exhaust and intake port centers.

FRANK McGOWEN.
MARION C. TRAVIS.

REFERENCES CITED

The following references are of record in the file of this patent:

UNITED STATES PATENTS

| Number | Name | Date |
| --- | --- | --- |
| 1,512,874 | Burtnett | Oct. 21, 1924 |
| 1,609,898 | Beasley | Dec. 7, 1926 |
| 2,029,581 | Merriam | Feb. 4, 1936 |
| 2,057,340 | Minter | Oct. 13, 1936 |
| 2,154,871 | Schlorf | Apr. 18, 1939 |